(12) United States Patent
Ritter et al.

(10) Patent No.: US 7,184,583 B2
(45) Date of Patent: Feb. 27, 2007

(54) IMAGE SYSTEM FOR PROCESSING IMAGE DATA

(75) Inventors: Manfred Ritter, Forchheim (DE); Willibald Zahnleiter, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 595 days.

(21) Appl. No.: 10/695,184

(22) Filed: Oct. 28, 2003

(65) Prior Publication Data

US 2004/0136585 A1 Jul. 15, 2004

(30) Foreign Application Priority Data

Oct. 28, 2002 (DE) ............................. 102 50 197

(51) Int. Cl.
*G06K 9/00* (2006.01)
*G06K 9/40* (2006.01)

(52) U.S. Cl. .................. 382/132; 382/260; 382/274; 128/922

(58) Field of Classification Search ............... 382/100, 382/128, 132, 254, 260, 274; 128/922; 345/60, 63, 89
See application file for complete search history.

(56) References Cited

U.S. PATENT DOCUMENTS

| | | | | |
|---|---|---|---|---|
| 5,252,931 A | * | 10/1993 | Nishiyama | 330/263 |
| 5,870,154 A | * | 2/1999 | Conover et al. | 348/673 |
| 5,991,456 A | * | 11/1999 | Rahman et al. | 382/254 |
| 6,246,783 B1 | * | 6/2001 | Avinash | 382/128 |
| 6,252,931 B1 | * | 6/2001 | Aach et al. | 378/98.2 |
| 6,760,401 B2 | * | 7/2004 | Schmitz et al. | 378/62 |
| 6,778,692 B1 | * | 8/2004 | Yazici | 382/132 |
| 6,788,826 B1 | * | 9/2004 | Van de Velde et al. | 382/275 |
| 6,834,125 B2 | * | 12/2004 | Woodell et al. | 382/274 |
| 6,950,563 B1 | * | 9/2005 | Molocher et al. | 382/278 |
| 7,102,792 B2 | * | 9/2006 | Eschbach et al. | 358/3.27 |
| 7,110,497 B2 | * | 9/2006 | Halsmer et al. | 378/98.12 |
| 2001/0051065 A1 | * | 12/2001 | Togami | 400/76 |
| 2002/0131052 A1 | * | 9/2002 | Emery | 356/511 |
| 2002/0147399 A1 | * | 10/2002 | Mao et al. | 600/458 |

(Continued)

FOREIGN PATENT DOCUMENTS

| EP | 0 654 943 | 5/1995 |
|---|---|---|
| KR | 0654943 | * 11/1994 |

OTHER PUBLICATIONS

Validation of Medical Image Processing in Image-Guided Therapy, IEE transactions on medical imaging, vol. 21, No. 12,Dec.2002.*

(Continued)

*Primary Examiner*—Joseph Mancuso
*Assistant Examiner*—Nancy Bitar
(74) *Attorney, Agent, or Firm*—Schiff Hardin LLP

(57) ABSTRACT

An image system for processing image data in the form of grey-scale value signals and for generating an image that can be displayed on a presentation device, in particular for a medical diagnostic device, has a circuit to harmonize the image data. This circuit is fashioned for automatic contrast increase by a new adjustment of the grey-scale value signals, and thus of the grey-scale value dynamic range as well, with the C-value defining the center of the grey-scale value range, being retained after the harmonization.

8 Claims, 2 Drawing Sheets

U.S. PATENT DOCUMENTS

2005/0111727 A1* 5/2005 Emery .................. 382/145
2005/0129311 A1* 6/2005 Haynes et al. ............. 382/170
2005/0215207 A1* 9/2005 Sorrells et al. .......... 455/114.1

OTHER PUBLICATIONS

ColorIntegrity Adobe Photoshop* Plug-In Complete User's Manual, release 1.11,Sep. 2006, David Dunthorn.*

Performance Factors Analysis of a Wavelet-based Watermarking Method , Chaw-Seng Woo1, Jiang Du1, Binh Pham2 1Information Security Research Centre (ISRC),2Faculty of Information Technology , Queensland University of Technology GPO Box 2434, Brisbane, QLD4001, AUSTRALIA.*

Digitale Bildsignalverarbeitung, Grundlagen, Verfagren, Beispiele, Wahl (1984) pp. 62-68.

* cited by examiner

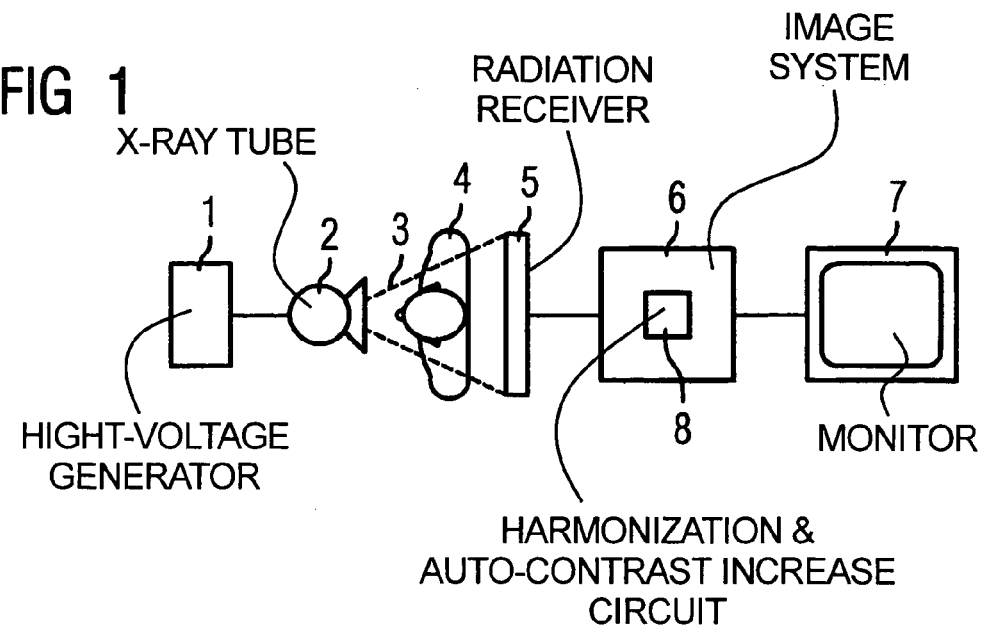
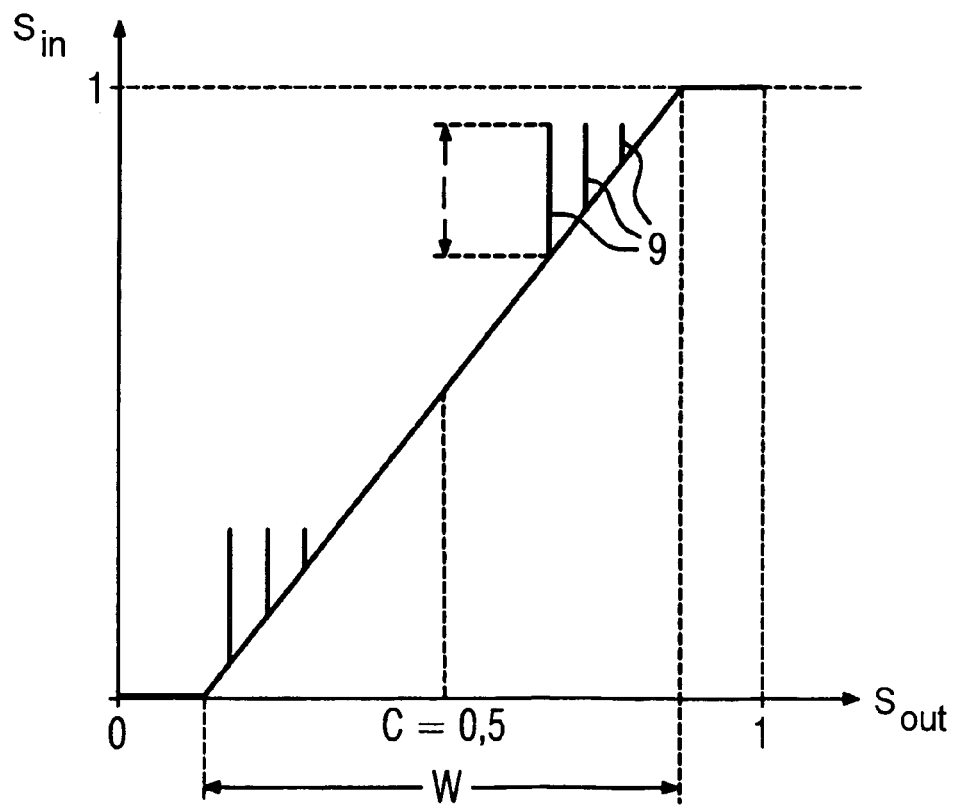

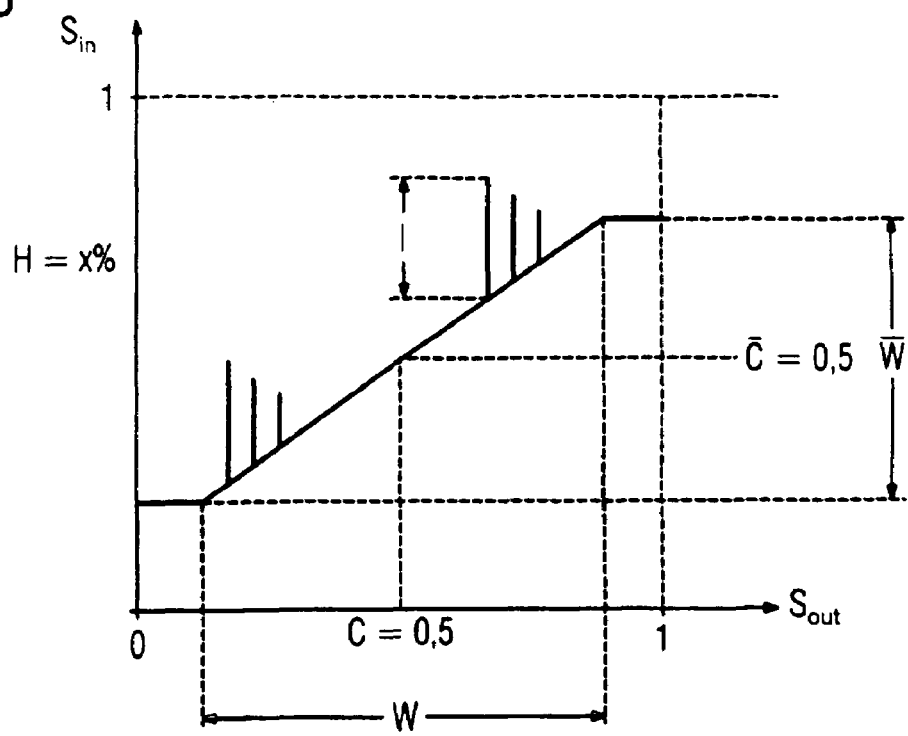
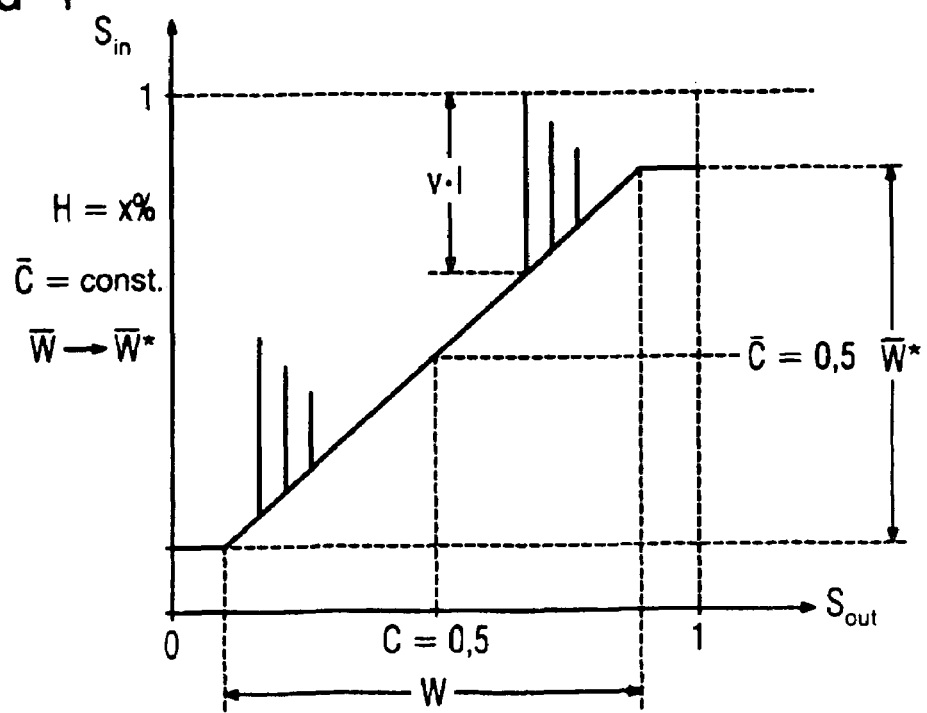

IMAGE SYSTEM FOR PROCESSING IMAGE DATA

BACKGROUND OF THE INVENTION

1. Field of the Invention

The present invention concerns an image system for processing image data in the form of grey-scale value signals and generating of an image that can be displayed on a presentation device, in particular for a medical diagnostic device, of the type having a circuit to harmonize the image data.

2. Description of the Prior Art

Image systems of the above type are known and are used primarily in connection with x-ray diagnostic devices, wherein they serve to generate a diagnostically meaningful x-ray image using the image data acquired via the x-ray examination. Such x-ray diagnostic devices have an image converter to convert the x-ray image into an electrical analog signal sequence, an image or, a video signal. Such an image converter can be, for example, a solid-state image detector. Since medical image systems generally are fashioned digitally, the supplied image signals are converted into corresponding digital values, for which the x-ray image is separated into different image points (pixels) with which different digital grey values are respectively associated. The acquired images normally are presented to the physician on a suitable monitor as grey-scale images for assessment of the diagnosis findings.

Furthermore, it is known to process the acquired image data or the grey-scale value signals in order to specifically change the generated image with regard to the image impression or effect, in order to be able to extract different information from the generated image. One such image processing technique is known as harmonization, also known as DDO (Dynamic Density Optimization). In such harmonization, frequently also called Dynamic Range Control or "dynamic compensation" or "dynamic balancing," the originally acquired image data, known as "raw image data", are filtered with a weighted low-frequency filter, undergoing a smoothing of the image data. A shrinking of the grey-scale value range in which the image data lie ensues by this low-frequency filtering, i.e. the image overall becomes "flatter", the contrast decreases. Although the high-pass filtering causes the higher-frequency portions to be advantageously filtered, the flattening of the image and decrease of the grey-scale value range and the contrast loss associated therewith lead to a changed image impression.

In order to be able to again compensate the "image flattening" that ensues via the harmonization, it is conventional for optimization actions to be manually applied by the physician or technician. Such actions in turn cause other image-determining parameters to be manipulated due to the manual change, such that the image impression is again changed and significance is lost. For example, the image brightness can disadvantageously be affected, so the image can become too dark or too light, etc.

SUMMARY OF THE INVENTION

An object of the present invention is to provide an image system that remedies the above problem and largely reduces the manual optimization by the physician or technician.

This object is achieved in accordance with the invention in an image system of the type described above, wherein the harmonization circuit is fashioned for automatic contrast increase by a new adjustment of the grey-scale value signals, and therewith the grey-scale value dynamic range, while retaining the C-value, that defines the center of the grey-scale value range, after the harmonization.

In the inventive image system, an automatic contrast increase ensues after the harmonization in order to compensate the contrast flattening that occurs due to the harmonization. This contrast increase inventively ensues while maintaining the center value (C-value), meaning the average image brightness is maintained. By the automatic adjustment or compensation, the entire grey-scale value dynamic range is adapted for optimization of the image impression, which effects a contrast increase. The physician or technician thus no longer is required as before to act manually and to attempt by a sequence of manual operations, to optimize the image. Instead the image system does this for the physician or technician while retaining the C-value in the context of the automatic contrast increase.

The automatic adjustment can ensue in the same manner, dependent on superimposed higher-frequency signal portions for intensification. In the new adjustment, the grey-scale value window (defined by a value known as the window value or W-value) is in effect enlarged, raising the contrast, this window having been flattened in the harmonization. If higher-frequency signal portions are present in the grey-scale value signals, the adjustment retaining these higher-frequency signal portions can ensue in order to prevent these portions from being disadvantageously affected due to the new adjustment, or the enlargement of the grey-scale value window. The goal in any case is to display these higher-frequency portions or regions of the image with an intensification thereof, and thus to increase the contrast, in the course of the adjustment.

Inventively in the automatic adjustment the higher-frequency signal portion, that occurs at the dynamic boundary can be determined, dependent on which the adjustment inventively ensues, so that the higher-frequency signal portions are not excluded by the grey-scale value dynamic range. The automatic contrast adjustment (auto-contrast function) determines the higher-frequency signal portion that lies next to the dynamic limit. The window or the grey-scale value range is now enlarged in accordance with the invention to the extent that this higher-frequency signal portion always lies within the maximum grey-scale value dynamic range, and this signal portion consequently is not excluded, which would lead to an information loss. The enlargement of the grey-scale value window thus ensues while retaining the dynamic limit as well as the higher-frequency signal portion next to it, insofar as this higher-frequency signal portion exceeds the low-frequency portions that so otherwise it would be excluded.

For this purpose an intensification factor is automatically determined by which the signal portion next to the dynamic limit is to be boosted or intensified, such that it still lies within the dynamic limit or a limit lying below the dynamic limit. It is not always necessary or desired for optimization purposes to enlarge the grey-scale value window to the maximum possible, rather it is possible to enlarge the window only to a limit lying below the upper dynamic limit. This limit can be established by the physician; for example, or this limit can be automatically selected dependent on other image-determining or processing-technology parameters. The harmonization circuit is then capable of automatically determining a corresponding intensification factor that leads to the allowable increase in accordance with this invention. The other regions of the overall signal curve are likewise correspondingly boosted, but with region-specific intensification factors that are in turn dependent on the final determined intensification factor.

In an embodiment of the invention that the automatic contrast increase can be activated on by the technician. It is conveniently part of an organ program (i.e., the program that automatically parameterizes the imaging system given a designation (entry) of the organ to be imaged), insofar as it is a medical system into which the inventive image system is integrated. The physician or technician thus can decide whether to activate the auto-contrast function or not. The circuit also can automatically react, with regard to the contrast increase, to the type of display selected by the physician. For example, the physician can switch from a display of the bones in black to a white display, or select this display at the outset. The circuit appropriately adapts the automatic contrast increase and takes the desired display type into account.

The harmonization circuit additionally can implement a parameterizable location frequency filtering of the image data, with the implementation of an automatic contrast increase being dependent on the filter parameter of the spatial frequency filtering. As a rule, the filter factor of the spatial frequency filtering of the image data can be adjusted by the physician or technician, so it can be parameterized. If the spatial frequency filtering is implemented with a relatively high filter factor, a subsequent auto-contrast function in accordance with the invention would thus be disadvantageous. Because it would otherwise, as the case may be, amount to a an overly strong boosting of regions that are already strongly emphasized by the spatial frequency filtering, it would result in blooming or formation of double lines. In order to prevent this, according to this inventive embodiment the auto-contrast increase is implemented only when it is sensible with regard to the parameterized spatial frequency filtering parameter.

To prevent operational errors by the physician or technician, it can be convenient to allow the operator to first propose a filter parameter for spatial frequency filtering via a user interface at which the physician or technician operates the image system. The automatic contrast increase that will ensue dependent on the proposed input filter parameter is then automatically determined. If the spatial frequency filtering parameter that is entered by the operator will make a subsequent automatic contrast increase in accordance with the invention reasonable, the operator is not even offered this function at all.

DESCRIPTION OF THE DRAWINGS

FIG. 1 is a block diagram of an x-ray diagnostic device with the inventive image system.

FIG. 2 is a diagram with an exemplary grey-scale value signal curve showing only one principle curve, before the harmonization.

FIG. 3 shows the grey-scale value signal curve from FIG. 2 after the harmonization.

FIG. 4 shows the grey-scale value signal curve from FIG. 3 after the inventive automatic contrast intensification.

DESCRIPTION OF THE PREFERRED EMBODIMENTS

FIG. 1 shows the basic electrical assembly of an x-ray diagnostic device. A high-voltage generator 1 is shown that powers an x-ray tube 2 having a beam path 3 in which a patient 4 is located. A radiation receiver 5 (for example a solid-state radiation detector) located in the beam path 3 receives the x-ray radiation that permeates the patient 4 and converts this into corresponding image signals that are supplied to a subsequently connected image system 6. The signals are processed to generate an image suitable for a presentation device in the form of a monitor 7. Other presentation devices, for example printers, also can be connected to the image system in parallel with the monitor 7. Alternatively, the image system 6 can be fashioned for transmission to an external monitor via corresponding data lines.

In the image system 6, a circuit 8 is provided to undertake the inventive image processing with harmonization and automatic contrast increase while retaining the average image brightness (thus the C-value or center value).

Naturally, further components are included in the image system 6, FIG. 1 shows a basic arrangement that for purposes of explanation shows only the fundamental components. Operation ensues via a user interface that is not specifically shown, for example an operator console and monitor or a keyboard, etc.

FIGS. 2–4 show the grey-scale value signal curve changes due to the harmonization and the subsequent auto-contrast function.

FIG. 2 shows an exemplary signal curve. The grey-scale value input signals (here idealized from 0 to 1), i.e., the input signal coming from the radiation receiver 5 and indicated to the image system 6, are plotted along the abscissa (x-axis). For example, if the grey-scale value range ranges from 0 to 1023, it thus comprises overall 1024 grey-scale values. The grey-scale value output signal, thus the output signal given by the image system to the monitor 7, is also plotted here along the ordinate [y-axis] idealized from 0 to 1. The signal visibly rises within the grey-scale value range from the lower dynamic limit to the upper dynamic limit. Furthermore, the center value C is indicated, that here is at C=0.5. The curve thus shows the transformation of the input signals into the output signals.

Furthermore, some exemplary amplitudes 9 are shown in the form of the vertical lines that are higher-frequency signal portions that are superimposed on the low-frequency signal. At the left of the three upper amplitudes 9, as an example its length 1 is indicated that, as is shown in the following, is changed due to the inventive auto-contrast function. FIG. 2 shows the output state of the grey-scale value signal curve before the harmonization.

Starting from the curve according to FIG. 2, a harmonization is now implemented. A low-pass filtering hereby ensues, whereby the low-frequency signals are filtered. This low-pass filtering ensues without changing of the center value C. The curve, and with it the image, becomes "flatter": the rise of the curve is obviously visibly less than in comparison to FIG. 2, the window width $\overline{W}$ of the transformed output signal has been reduced. The flatness of the image can be simply clarified using the window $\overline{W}$ drawn around the $\overline{C}$-value in FIG. 3. The harmonization ensues here with an arbitrary harmonization factor of x percent. The position of the amplitudes 9 also inevitably changes via the harmonization, and with it the flattening.

The inventive automatic contrast intensification now ensues via the circuit 8. For this, the maximum amplitude 9 is first determined. Starting from FIG. 3, this would be the left of the three upper amplitudes, for which its length 1 is indicated. Furthermore, it is automatically determined which intensification factor v is to be used so that the intensified value still lies within the dynamic limit. It is thus hereby determined how the grey-scale value signals are to be newly adjusted, and therewith also the maximum higher-frequency portions that lie directly inside the dynamic range and that are not excluded. In FIG. 4, the signal curve generated via the newly adjustment is shown. The signal curve again visibly proceeds somewhat steeper in comparison to that according to FIG. 3, the "length" of the "highest" amplitude of the higher-frequency portions is v·1 and ends in the shown example at the upper dynamic range limit. The other amplitudes were also correspondingly intensified. The new adjustment expresses itself in the described window width $\overline{W^*}$ around the center value $\overline{C}$ and the signal upper limit of the low-frequency curve, it is visibly larger than the window $\overline{W}$ in FIG. 3. The center value C or $\overline{C}$ was retained, meaning the average image brightness remains the same in spite of the automatic contrast increase; only the grey-scale value dynamic range is increased, whereby a contrast increase ensues. By this automatic increase that retains the higher-frequency portions that in effect provide the intensification measure and should not be excluded, an intensification of the higher-frequency portions or ranges of the image also results, depending on the parameter/parameter set used for the auto-contrast adjustment.

The automatic contrast increase can be a part of an organ program and can be activatable and deactivatable. The possibility also exists to undertake the harmonization and subsequent auto-contrast function into consideration in the contrast further image processing parameters such as, for example, a spatial frequency filtering selected by the operator. For example, given a selected spatial frequency filtering, the new adjustment can be implemented automatically dependent on this selected spatial frequency filtering parameter, and optimized such that, in spite of the selected spatial frequency filtering and subsequent contrast increase, over-intensification in the image, and for example double lines or blooming resulting therefrom, are prevented. Thus the harmonization with a lower filter value (a smaller x-%-value) can ensue, or the new adjustment can ensue short of (below) the dynamic upper limit, with a limit value lying below the upper limit that can be automatically established in this case in order to prevent too strong an increase of the higher-frequency portions. Furthermore, the auto-contrast function can be parameterized dependent on the medical question posed, i.e. it can be dependent, for example, on whether a bone in the image should be displayed white or black.

In summary, the inventive specified harmonization together with automatic contrast increase, taking the higher-frequency portions into account, allows a contrast increase of both the low-frequency signals and the higher-frequency signals without the danger of possible over-intensification.

Consequently, the physician or technician no longer has to manually post-process, rather the inventive image system offers the possibility to receive displayed a largely optimized image by the simple selection of the respective basic functions.

Although modifications and changes may be suggested by those skilled in the art, it is the intention of the inventors to embody within the patent warranted hereon all changes and modifications as reasonably and properly come within the scope of their contribution to the art.

We claim as our invention:

1. An image system for processing image data, comprising:
    a harmonization circuit supplied with image data comprised of grey-scale value signals in a grey-scale value range having a C-value defining a center of said grey-scale value range, said harmonization circuit automatically adjusting said grey-scale value signals to effect a contrast increase and simultaneously adjusting said grey-scale value range, to obtain a new grey-scale value range, retaining the C-value of said grey-scale value range in said new grey-scale value range, thereby obtaining adjusted grey-scale value signals; and
    a presentation device connected to said harmonization circuit and supplied with said adjusted grey-scale value signals for presenting an image comprised of said grey-scale value signals.

2. An image system as claimed in claim 1 wherein the grey-scale value signals supplied to the harmonization circuit contain higher-frequency signal portions, and wherein said harmonization circuit automatically increases said contrast with an intensification of the higher-frequency signal portions.

3. An image system as claimed in claim 2 wherein said grey-scale value range has a dynamic boundary and wherein said harmonization circuit adjusts the grey-scale value range dependent on a higher-frequency signal portion, after intensification thereof, that is next to said dynamic boundary.

4. An image system as claimed in claim 3 wherein said harmonization circuit automatically determines an intensification factor for intensifying said higher-frequency signal portion so that said higher-frequency signal portion next to said dynamic boundary does not exceed said dynamic boundary.

5. An image system as claimed in claim 2 wherein said harmonization circuit adjusts said grey-scale value range so that none of the higher-frequency signal portions is excluded.

6. An image system as claimed in claim 1 comprising a user interface connected to said harmonization circuit allowing a user to selectively activated and deactivate said automatic contrast increase.

7. An image system as claimed in claim 1 wherein said harmonization circuit comprises a spatial frequency filter, having a filter parameter associated therewith, and wherein said harmonization circuit automatically increases said contrast dependent on said filter parameter.

8. An image system as claimed in claim 7 comprising a user interface allowing entry of said filter parameter, and wherein said harmonization circuit presents, at said presentation device, a proposal for said automatic contrast increase dependent on said filter parameter.

* * * * *